(12) United States Patent
Bibl et al.

(10) Patent No.: US 9,154,866 B2
(45) Date of Patent: Oct. 6, 2015

(54) FIBER-BASED ELECTRONIC DEVICE STRUCTURES

(75) Inventors: David Bibl, Santa Cruz, CA (US); Matthew Rohrbach, San Francisco, CA (US); Peter Russell-Clarke, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 847 days.

(21) Appl. No.: 12/637,509

(22) Filed: Dec. 14, 2009

(65) Prior Publication Data

US 2010/0315299 A1 Dec. 16, 2010

Related U.S. Application Data

(60) Provisional application No. 61/185,934, filed on Jun. 10, 2009.

(51) Int. Cl.
*H01Q 1/42* (2006.01)
*H04R 1/10* (2006.01)

(52) U.S. Cl.
CPC ......... *H04R 1/1033* (2013.01); *Y10T 29/49018* (2015.01)

(58) Field of Classification Search
USPC .................................................. 343/702, 872
See application file for complete search history.

(56) References Cited

U.S. PATENT DOCUMENTS

| | | |
|---|---|---|
| 1,523,051 A | 1/1925 | Carpenter et al. |
| 2,446,292 A | 8/1948 | Priestley et al. |
| 3,448,823 A | 6/1969 | Smith |
| 3,453,373 A | 7/1969 | Yamamoto et al. |
| 3,899,380 A | 8/1975 | Pihlstrom |
| 4,663,498 A | 5/1987 | Rye |
| 4,807,962 A | 2/1989 | Arroyo et al. |
| 5,282,846 A | 2/1994 | Schmitt |
| 5,385,580 A | 1/1995 | Schmitt |
| 5,706,168 A | 1/1998 | Erler et al. |
| 5,953,434 A | 9/1999 | Boyden |

(Continued)

FOREIGN PATENT DOCUMENTS

| | | | |
|---|---|---|---|
| DE | 19734283 A1 | * | 2/1999 |
| GB | 250 765 | | 4/1926 |

(Continued)

OTHER PUBLICATIONS

"Sony VAIO VGN-SZ381P/X" [online]. Sony Electronics Inc. 2006 [retrieved on Dec. 7, 2009]: <URL: http://www.docs.sony.com/release/specs/VGNSZ381PX_mksp.pdf>.

*Primary Examiner* — Dieu H Duong
(74) *Attorney, Agent, or Firm* — Brownstein Hyatt Farber Schreck, LLP

(57) ABSTRACT

Fibers may be intertwined to form structures for electronic devices and other parts. Fibers may be intertwined using computer-controlled braiding, weaving, and knitting equipment. Binder materials may be selectively incorporated into the intertwined fibers. By controlling the properties of the intertwined fibers and the patterns of incorporated binder, structures can be formed that include antenna windows, sound-transparent and sound-blocking structures, structures that have integral rigid and flexible portions, and tubes with seamless forked portions. Fiber-based structures such as these may be used to form cables and other parts of headphones or other electronic device accessories, housings for electronic devices such as housings for portable computers, and other structures.

18 Claims, 28 Drawing Sheets

(56) References Cited

U.S. PATENT DOCUMENTS

| | | |
|---|---|---|
| 6,172,871 B1 | 1/2001 | Holung et al. |
| 6,210,422 B1 | 4/2001 | Douglas |
| 6,454,796 B1 | 9/2002 | Barkman et al. |
| 6,545,223 B2 | 4/2003 | Baldock |
| 6,576,832 B2 * | 6/2003 | Svarfvar et al. ............... 174/392 |
| 6,744,901 B2 | 6/2004 | Ito et al. |
| 7,012,189 B2 | 3/2006 | Kriege et al. |
| 7,335,006 B2 * | 2/2008 | Wilson et al. ................. 425/112 |
| 7,833,055 B2 | 11/2010 | Crooijmans et al. |
| 2002/0106952 A1 * | 8/2002 | Hashizume et al. ............ 442/43 |
| 2004/0227679 A1 * | 11/2004 | Lu ................................. 343/702 |
| 2005/0062486 A1 | 3/2005 | Qi et al. |
| 2006/0083907 A1 * | 4/2006 | Bech et al. .................... 428/212 |
| 2006/0110599 A1 * | 5/2006 | Honma et al. ................. 428/413 |
| 2007/0237170 A1 | 10/2007 | Proctor et al. |
| 2007/0277995 A1 | 12/2007 | Sakai |
| 2008/0019554 A1 | 1/2008 | Krywko et al. |
| 2008/0166003 A1 | 7/2008 | Hankey et al. |
| 2009/0130995 A1 | 5/2009 | Wang Chen |
| 2009/0136708 A1 * | 5/2009 | Huang et al. ................... 428/113 |
| 2009/0185340 A1 | 7/2009 | Ji et al. |
| 2009/0190785 A1 | 7/2009 | Sandberg |
| 2009/0233044 A1 * | 9/2009 | Sun et al. ....................... 428/113 |
| 2009/0296952 A1 | 12/2009 | Pantfoerder et al. |
| 2010/0056232 A1 * | 3/2010 | Lim et al. .................... 455/575.1 |

FOREIGN PATENT DOCUMENTS

| | | |
|---|---|---|
| JP | S62139207 | 6/1987 |
| JP | 2001103578 | 4/2001 |
| JP | 2002374596 | 12/2002 |
| JP | 2004253391 | 9/2004 |
| JP | 2005519548 | 6/2005 |
| JP | 2005191842 | 7/2005 |
| JP | 2008269799 | 11/2008 |
| WO | 00/74075 | 12/2000 |
| WO | 02/103713 | 12/2002 |
| WO | 2006/045988 | 5/2006 |
| WO | 2007/041256 | 4/2007 |

\* cited by examiner

1

FIBER-BASED ELECTRONIC DEVICE STRUCTURES

This application claims the benefit of provisional patent application No. 61/185,934, filed Jun. 10, 2009, which is hereby incorporated by reference herein in its entirety.

BACKGROUND

This invention relates to structures formed from fibers, and more particularly, to ways in which to form structures for electronic devices from fibers.

Modern weaving, braiding, and knitting equipment can be used to create structures that would be difficult or impossible to implement using other fabrication technologies. For example, woven carbon fiber sheets may be used to form housing structures for electronic devices that are lighter and stronger than housing structures formed from other materials. Flexible cable sheaths may be formed using fiber braiding tools. Many medical devices are formed from fibers. For example, bifurcated vascular grafts and other cardiovascular devices may be formed from fibers.

SUMMARY

Fiber-based structures may be used in forming structures for electronic devices. For example, intertwined fibers may be used in forming housings for electronic devices. The housings may have seamless compound curves. Features such as hooks and pockets may be formed as integral parts of fiber-based structures. These fiber-based structures may, if desired, include structures such as fiber-based cases for carrying an electronic device. Intertwined fibers may also be used to form sheaths for cables, parts of accessories such as headsets, and other structures.

Fiber intertwining equipment such as tools for weaving, braiding, and knitting may be used to intertwine fibers. The fibers that are intertwined with this equipment may include polymer fibers, metal fibers, insulator-coated metal fibers, glass fibers, or other suitable fibers. Once intertwined, a binder such as epoxy or other suitable matrix may be incorporated into the intertwined structure and cured.

Parameters that may be varied during the fabrication process include the number of fibers that are incorporated into a particular region of the structure, the spacing between fibers, fiber type, binder type, binder location, etc. By selectively varying these factors, structures can be formed in which different regions of the structures have different flexibilities, different densities (e.g., to adjust audio transparency, moisture penetration, etc.), different conductivities, etc. Shapes that may be formed using the intertwining equipment include forking structures (e.g., bifurcated structures), tubular structures of variable diameter, structures that have potentially complex compound curves, etc.

Further features of the invention, its nature and various advantages will be more apparent from the accompanying drawings and the following detailed description of the preferred embodiments.

DETAILED DESCRIPTION

Figure 1:
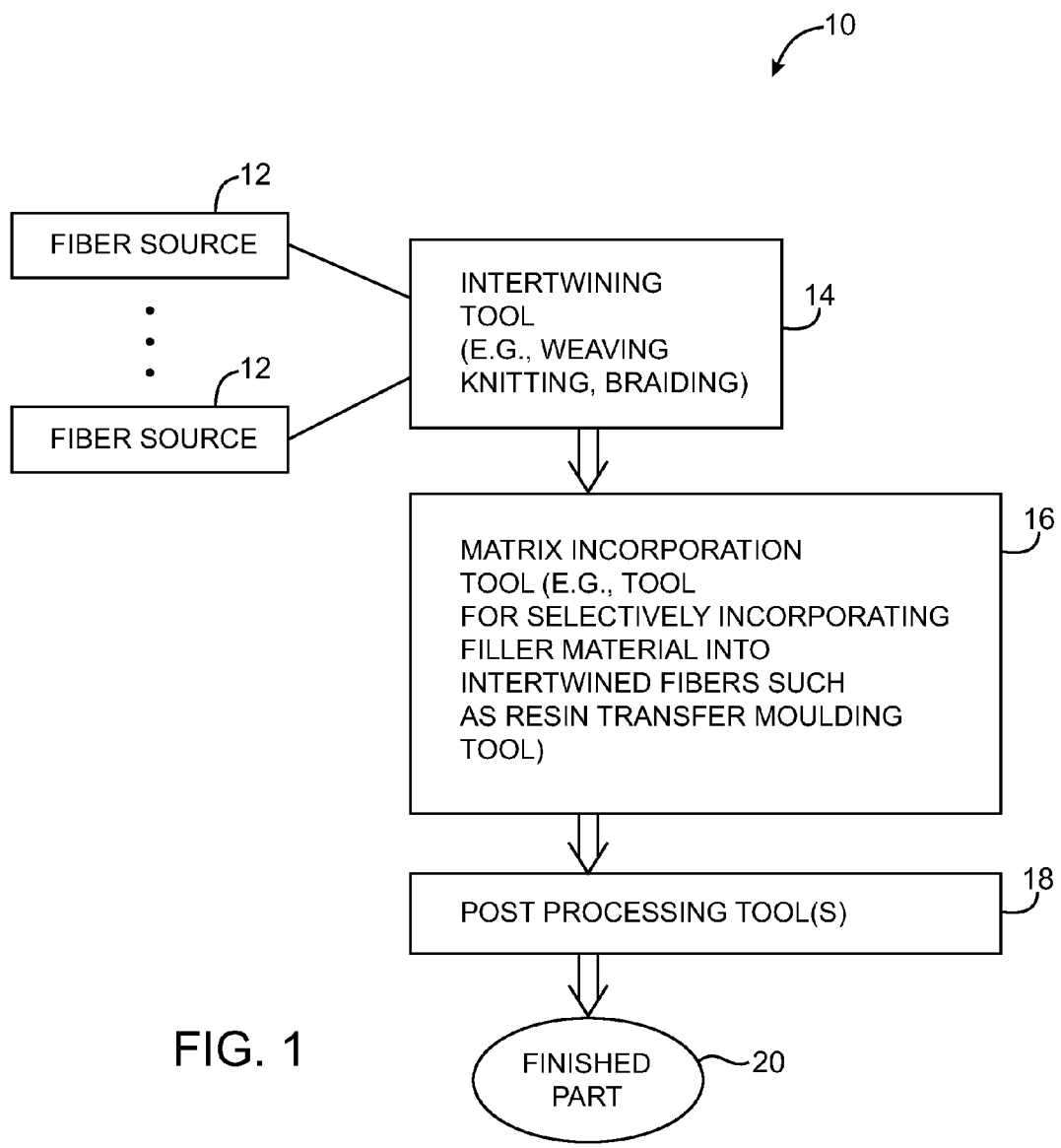
FIG. 1 is a schematic diagram of illustrative fabrication equipment that may be used to fabricate structures with intertwined fibers in accordance with an embodiment of the present invention.

A schematic diagram of illustrative fabrication equipment that may be used to fabricate structures with intertwined fibers in accordance with an embodiment of the present invention is shown in FIG. 1. Fabrication equipment may be used to form fiber-based structures for any suitable device. Examples in which fabrication equipment 10 is used to form parts of electronic devices such as electronic device housings, cable sheaths for headsets, electrical connectors, and other electrical equipment are sometimes described herein as an example. In general, however, fabrication equipment 10 may be used to form any suitable parts (e.g., parts for medical application, for industrial equipment, for mechanical structures with no electrical components, etc.).

As shown in FIG. 1, fabrication equipment 10 may be provided with fibers from fiber sources 12. Fiber sources 12 may provide fibers of any suitable type. Examples of fibers include metal fibers (e.g., strands of steel or copper), glass fibers (e.g., fiber-optic fibers that can internally convey light through total internal reflection), plastic fibers, etc. Some fibers may exhibit high strength (e.g., polymers such as aramid fibers). Other fibers such as nylon may offer good abrasion resistance (e.g., by exhibiting high performance on a Tabor test). Yet other fibers may be highly flexible (e.g., to stretch without exhibiting plastic deformation). The fibers provided by sources 12 may be magnetic fibers, conducting fibers, insulating fibers, or fibers with other material properties.

Fibers may be relatively thin (e.g., less than 20 microns or less than 5 microns in diameter—i.e., carbon nanotubes or carbon fiber) or may be thicker (e.g., metal wire). The fibers provided by sources 12 may be formed from twisted bundles of smaller fibers (sometimes referred to as filaments) or may be provided from sources 12 as unitary fibers of a single untwisted material. Regardless of their individual makeup (i.e. whether thick, thin, or twisted or otherwise formed from smaller fibers), the strands of material from fiber sources 12 are referred to herein as fibers. The fiber from sources 12 may also sometimes be referred to as cords, threads, ropes, yarns, filaments, strings, twines, etc.

Intertwining tool(s) 14 may be based on any suitable fiber intertwining technology. For example, intertwining equipment 14 may include computer-controlled weaving tools, computer-controlled braiding tools (e.g., for forming tubular structures), and/or computer-controlled knitting equipment (e.g., three-dimensional knitting tools capable of producing intertwining fiber structures with bifurcations, compound curves, and other such complex shapes). These tools are sometimes referred to collectively herein as intertwining tool (s) 14.

Tools 14 form intertwined fiber structures. Matrix incorporation tools(s) 16 may be used to incorporate binder material into the intertwined fiber (e.g., to provide these structures with rigidity or other suitable properties). The binder, which is sometimes referred to as a matrix, may be formed from epoxy or other suitable materials. These materials may sometimes be categorized as thermoset materials (e.g., materials such as epoxy that are formed from a resin that cannot be reflowed upon reheating) and thermoplastics (e.g., materials such as acrylonitrile butadiene styrene, polycarbonate, and ABS/PC blends that are reheatable). Both thermoset materials and thermoplastics and combinations of thermoset materials and thermoplastic materials may be used as binders if desired.

Tools 16 may include molds, spraying equipment, and other suitable equipment for incorporating binder into portions of the intertwined fibers produced by intertwining equipment 14. Tools 16 may, if desired, include computer-controlled equipment and/or manually operated equipment that can selectively incorporate binder into different portions of a workpiece in different amounts. For example, when it is desired to stiffen a fiber structure, more resin can be incorporated into the intertwined fiber, whereas less resin can be incorporated into the intertwined fiber when a flexible structure is being formed. Different portions of the same structure can be formed with different flexibilities in this way. Following curing (e.g., using heat or ultraviolet light, the binder will stiffen and harden). The resulting structure (called finished part 20 in FIG. 1) can be used in a computer structure, a structure for other electrical equipment, etc.

Figure 2:
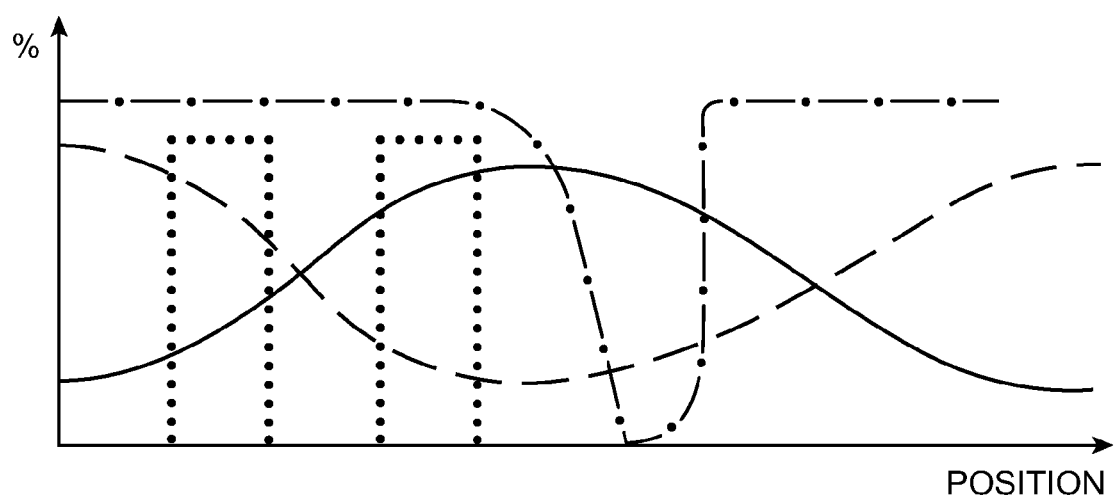
FIG. 2 is a graph showing how parameters such as intertwining parameters and binder incorporation parameters may be varied as a function of position within a structure when fabricating the structure in accordance with an embodiment of the present invention.

A graph showing how parameters such as intertwining parameters and binder incorporation parameters may be varied as a function of position within a structure when fabricating the structure is shown in FIG. 2. The horizontal axis in the graph of FIG. 2 represents position within a fiber-based structure (e.g., length along a cable or lateral distance across a planar surface). The vertical axis represents the magnitude of the parameter that is being varied. As the lines of the graph of FIG. 2 indicate, parameters can be varied smoothly and continuously, discretely, in an increasing fashion, decreasing, periodically, etc. Examples of parameters that can be varied according to the lines of the graph of FIG. 2 include the number of fibers in a given area, the size of the individual fibers, the spacing between adjacent fibers (porosity or fiber density), the type of filaments being used (e.g., the amount which a fiber or collection of fibers is insulating, abrasion-resistant, conducting, strong, magnetic, etc.), and the amount and/or type of binder being incorporated.

Figure 3:
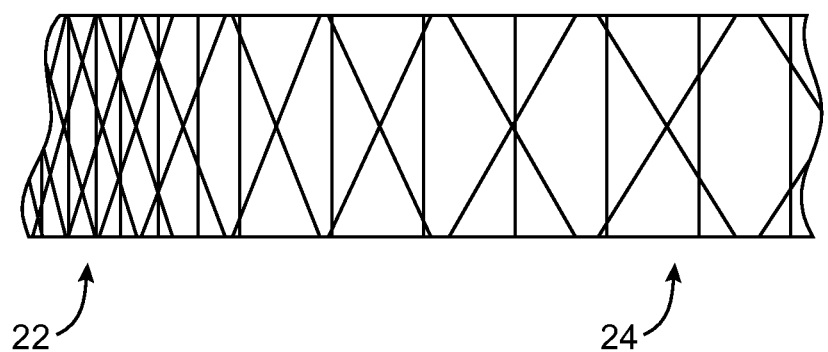
FIG. 3 is a side view of an illustrative structure showing how the number of fibers per unit area may be varied as a function of position in accordance with an embodiment of the present invention.

FIG. 3 is a side view of an illustrative structure such as a tube or planar patch of intertwined fiber showing how the number of fibers per unit area may be varied as a function of position. In region 22 there are more fibers per unit area than in region 24. The portion of the structure in region 24 will tend to be weaker, more porous and therefore transparent to moisture and sound, lighter, and more flexible than the portion of the structure in region 22.

Figure 4:
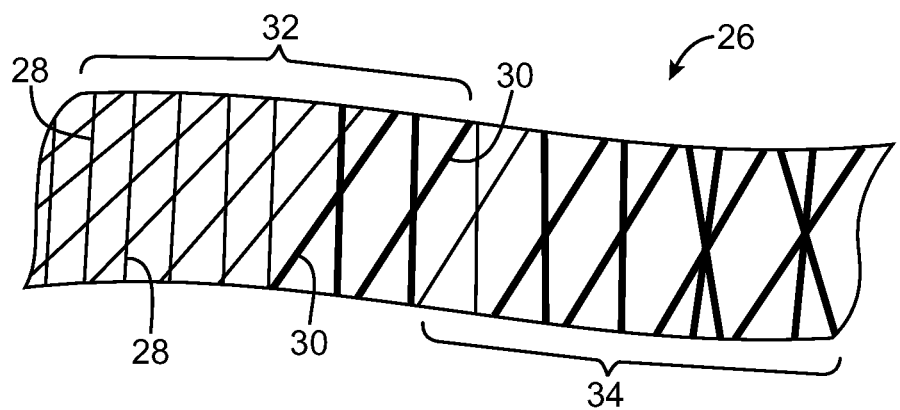
FIG. 4 is a side view of an illustrative structure showing how the type of fiber that is used may be varied as a function of position in accordance with an embodiment of the present invention.

As shown in FIG. 4, structure 26 may have two or more different types of fibers such as fibers 28 and fibers 30. These fibers may have different properties. In the FIG. 4 example, there are more of fibers 28 in region 32 than fibers 30. In region 34, however, fibers 30 are more prevalent than fibers 28. This type of spatial variation of fiber type allows the properties of structure 26 to be spatially adjusted during fabrication with equipment 10.

Figure 5:
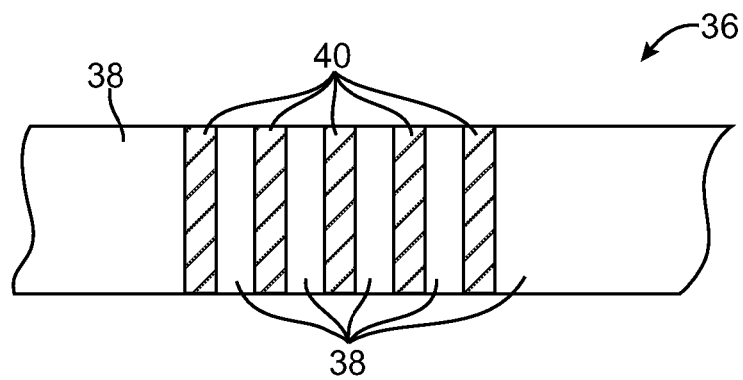
FIGS. 5, 6, and 7 are side views of illustrative binder incorporation patterns that may be used when forming structures in accordance with an embodiment of the present invention.
Figure 6:
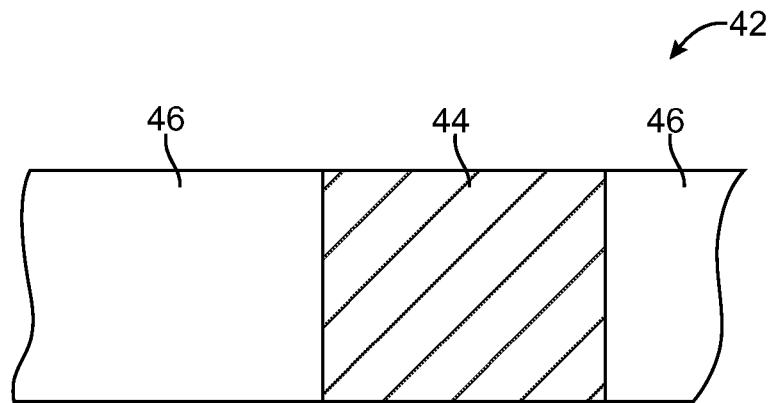
Figure 7:
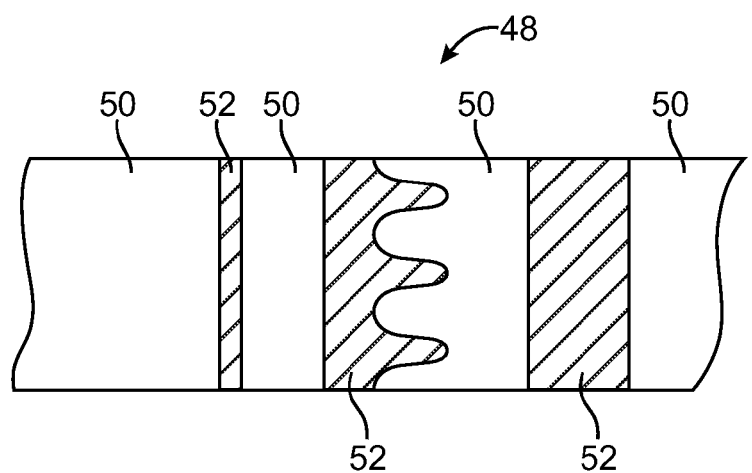

FIGS. 5, 6, and 7 are examples of structures in which binder has been incorporated in different patterns. In structure 36 of FIG. 5, intertwined fiber portions 38 may be formed without binder, whereas portions 40 may include binder. Structure 36 may be a fiber tube or a planar fiber-based structure (as examples). In structure 42 of FIG. 6, there is only a single relatively large portion of binder (region 44), while regions 46 are free of binder. In structure 48 of FIG. 7, regions 50 are binder-free, whereas regions 52 incorporate binder in different patterns.

Figure 8:
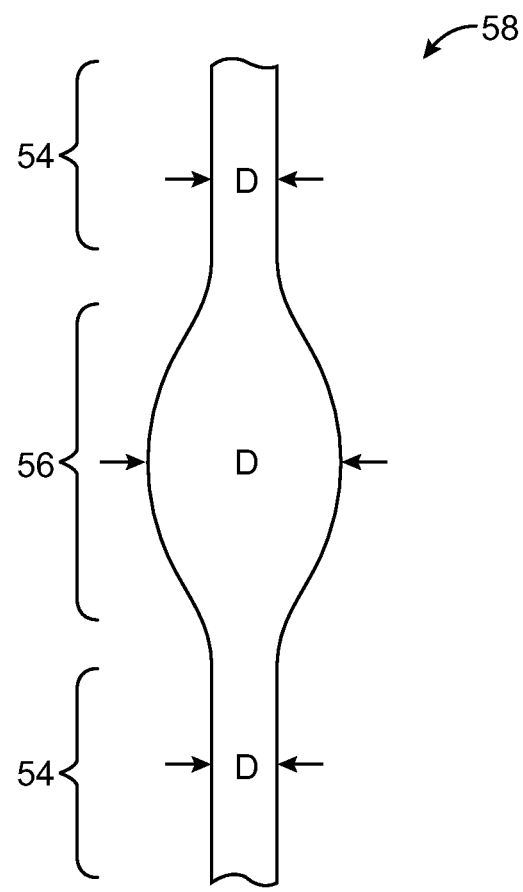
FIG. 8 is a view of an illustrative tubular structure with a diameter that has been varied during a fiber intertwining process in accordance with an embodiment of the present invention.

Equipment 10 can be used to form fiber-based structures of various shapes (e.g., tubes, planar members such as housing surfaces, spheres or parts of spheres, shapes with compound curves, cylinders or partial cylinders, cubes, tubes with bifurcations or regions of three-or more forked branches, combinations of these shapes, etc.). FIG. 8 shows how equipment 10 can form a tube or other structure 58 with a diameter D that is narrower in some regions (e.g., regions 54) than in other regions (e.g., region 56).

Figure 9:
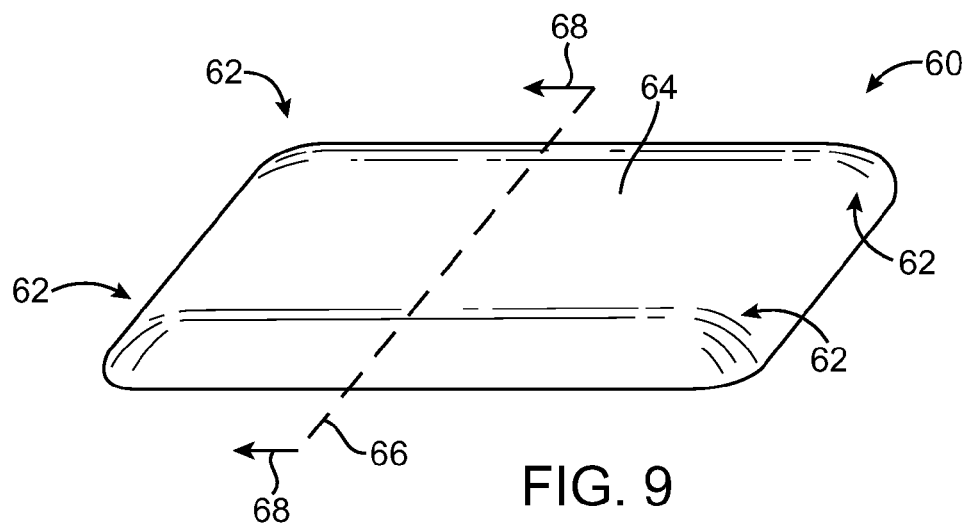
FIG. 9 is a perspective view of an illustrative electronic device having housing with compound curves that have been formed by intertwining fibers in accordance with an embodiment of the present invention.

A perspective view of an illustrative electronic device having a housing with compound curves is shown in FIG. 9. As shown in FIG. 9, device 60 may have a housing or other structure that has a planar rear surface portion such as portion 64. Device 60 may also have four corner portions 62. Each corner portion 62 has compound curves. These curves may be difficult or impossible to form from conventional woven-fiber sheets.

With equipment 10 of FIG. 1, three-dimensional (3D) knitting equipment or other intertwining tools 14 can be used to form a fiber-based structure (e.g., a housing or covering) that conforms to both the planar rear surface 64 and compound curve corners 62 of structure 60.

Figure 10:
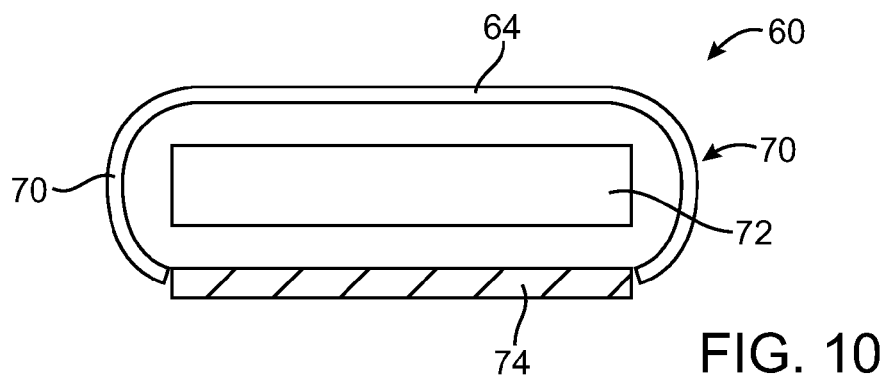
FIG. 10 is a cross-sectional side view of an illustrative electronic device having compound housing curves that have been formed by intertwining fibers and that contains electronic components and a display screen in accordance with an embodiment of the present invention.
Figure 11:
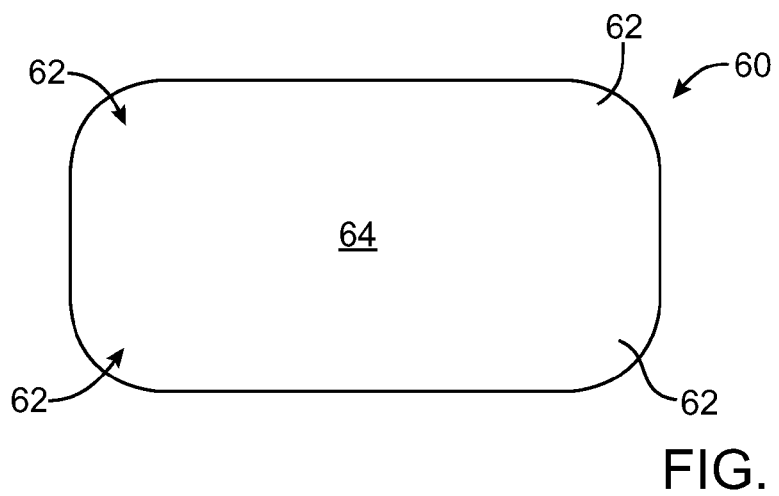
FIG. 11 is a rear view of an electronic device of the type shown in FIG. 10 in accordance with an embodiment of the present invention.

A cross-sectional side view of device 60 of FIG. 9 taken along line 66 of FIG. 9 and viewed in direction 68 is shown in FIG. 10. As shown in FIG. 10, device 10 may have curved sidewalls 70, a display or other front-mounted component 74, and internal electronic devices 72 (e.g., processor and memory circuitry). A rear view of device 60 is shown in FIG. 11, illustrating part of the curved shapes of corners 62 that can be covered smoothly without wrinkles or seams using the knit fiber produced by equipment 10.

Figure 12:
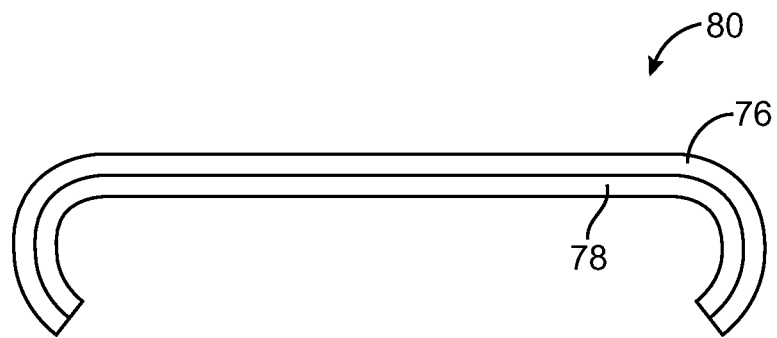
FIG. 12 is a cross-sectional side view of an illustrative structure having a layer of intertwined fibers that have been used to form a cosmetic cover layer and a fiber sheet that has been used to implement a structural support member in accordance with an embodiment of the present invention.

The ability of equipment 10 to produce thin layers of intertwined fiber that conform to complex non-planar shapes can be used to create a cosmetic cover layer with compound curves. As shown in FIG. 12, device housing 80 may have an inner layer 78 that is formed from a planar sheet of fiber with cut-away portions to accommodate compound curve housing shapes (e.g., corners 62 of FIG. 9). Layer 76 may be a conformal cosmetic cover layer formed using equipment 76. Layers 76 and/or layer 78 may be impregnated with binder using a matrix incorporation tool.

Figure 13:
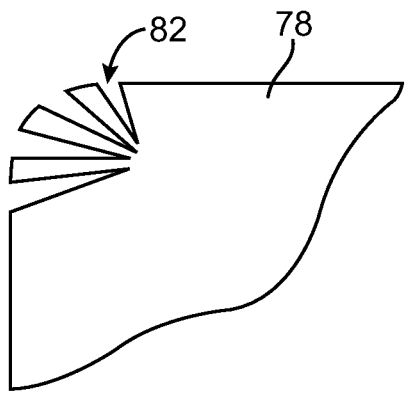
FIG. 13 is a top view of an illustrative fiber sheet of the type shown in FIG. 12 showing portions where material may be removed to help the fiber sheet accommodate a compound curve shape in accordance with an embodiment of the present invention.

FIG. 13 is a top view of a planar layer such as layer 78 that has removed portions 82 to accommodate compound curve shapes (e.g., housing corners). This process leaves unsightly seams that are hidden by cosmetic layer 76 (FIG. 12).

Figure 14:
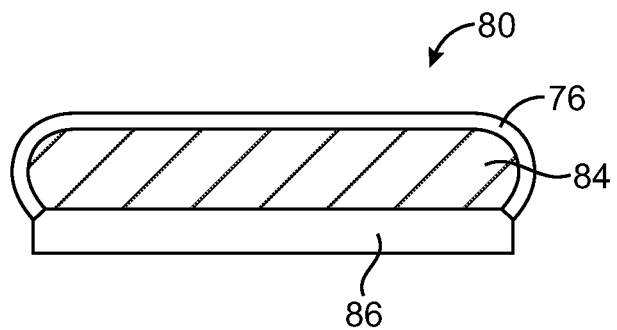
FIG. 14 is a cross-sectional side view of an illustrative structure in which an inner support structure such as a solid support or a skeletal frame has been covered with a layer of fiber that has been intertwined to accommodate a compound curve shape in accordance with an embodiment of the present invention.

FIG. 14 is a cross-sectional side view of device 80 showing how layer 76 may conformally cover an inner support structure (i.e., structure 84) and how device 80 may have a display module or other component 86 mounted to its front surface. Structure 84 may be solid, may be hollow (e.g., as in a frame or skeletal support), may include components, etc.

Figure 15:
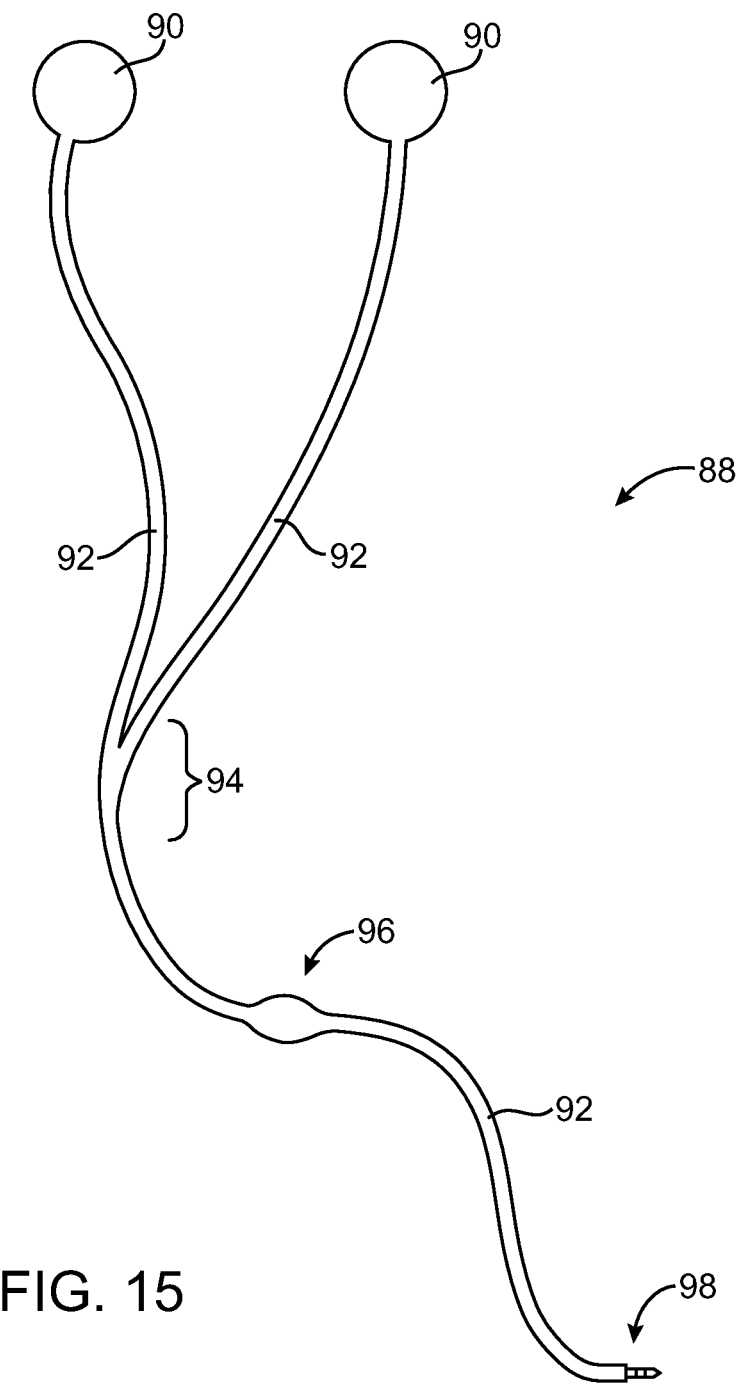
FIG. 15 is a perspective view of an illustrative electronic device that may be formed using intertwined fiber in accordance with an embodiment of the present invention.

An example of an electronic device that may be formed from intertwined fiber structures is a pair of audio headphones. An illustrative headset is shown in FIG. 15. As shown in FIG. 15, headset 88 may include a main cable portion 92. Cable 92 may be formed from intertwined fibers and may have portions formed from different types and amounts of fibers and different patterns and amounts of binder (as examples). Earbuds 90 may be mounted at the ends of the right and left branches of cable 92. In region 94, cable 92 may have a bifurcation (forked region). Feature 96 may be an enclosure for a switch, microphone, etc. The end of cable 92 may be terminated by audio connector (plug) 98.

Figure 16:
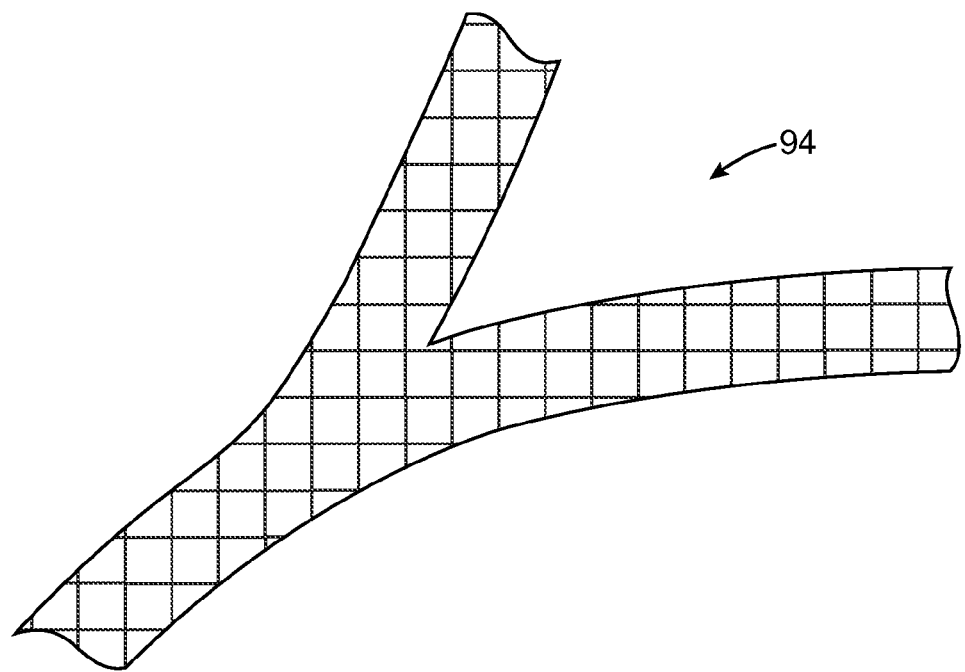
FIG. 16 is a perspective view of a forked (bifurcated) tubular structure formed with intertwining equipment in accordance with an embodiment of the present invention.
Figure 17:
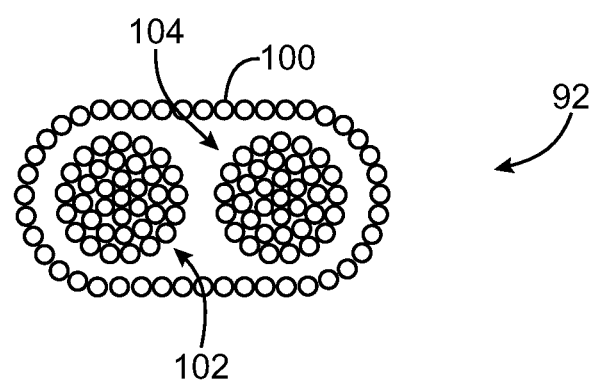
FIG. 17 is a cross-sectional view of a tubular structure such as a cable for an electronic device in accordance with an embodiment of the present invention.

FIG. 16 shows how intertwining tool 14 may, if desired, form Y-junction 94 of cable 92 without visible seams. A cross-sectional view of cable 92 is shown in FIG. 17. As shown in FIG. 17, cable 92 may have a tubular sheath such as sheath 100 that surrounds one, two, or more than two wires. In the FIG. 17 example, there are two conductive wire bundles within sheath 100. Wire bundle 102 may be formed from a first set of metal fibers and wire bundle 104 may be formed from a second set of wire bundles. The individual wires in bundles 102 and 104 may be coated with a thin layer of insulator (if desired). Sheath 100 may be formed from a fiber with sufficient strength to resist damage during use by a user and sufficient flexibility to allow cable 92 to flex. If desired, regions such a Y-junction region 94 and portions of device 88 near earbuds 90 and plug 98 may be provided with stronger fibers and more binder to strengthen these regions.

Figure 18:
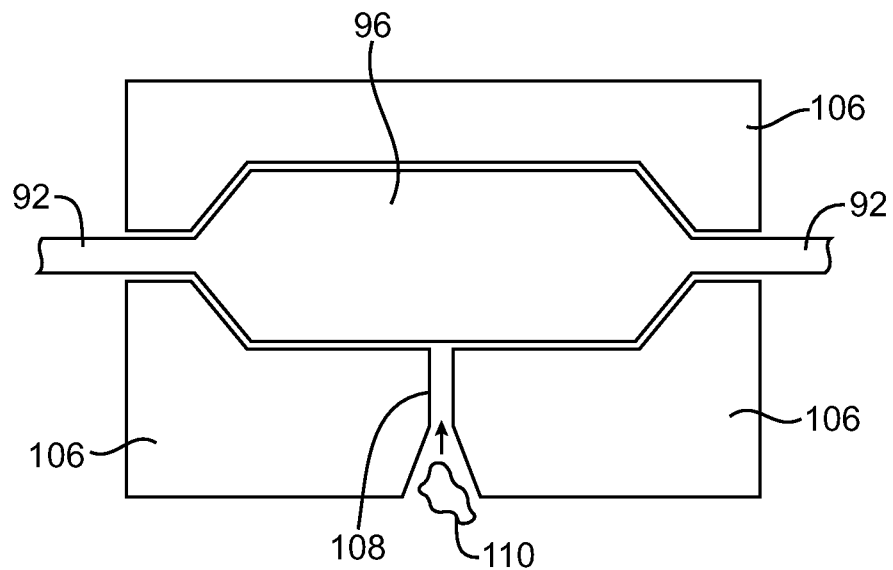
FIG. 18 is a cross-sectional side view of illustrative resin transfer mold equipment that may be used to selectively incorporate binder into intertwined fibers in accordance with an embodiment of the present invention.

Structure 96 may also be strengthened in this way. As an example, structure 96 may be impregnated with binder, whereas most of the rest of cable 92 may be left binder-free. FIG. 18 shows how a resin transfer molding tool such as tool 106 may be used to selectively incorporate binder 110 into region 96 of cable 92 (e.g., by introducing binder 110 into the interior of tool 106 through opening 108).

Figure 19:
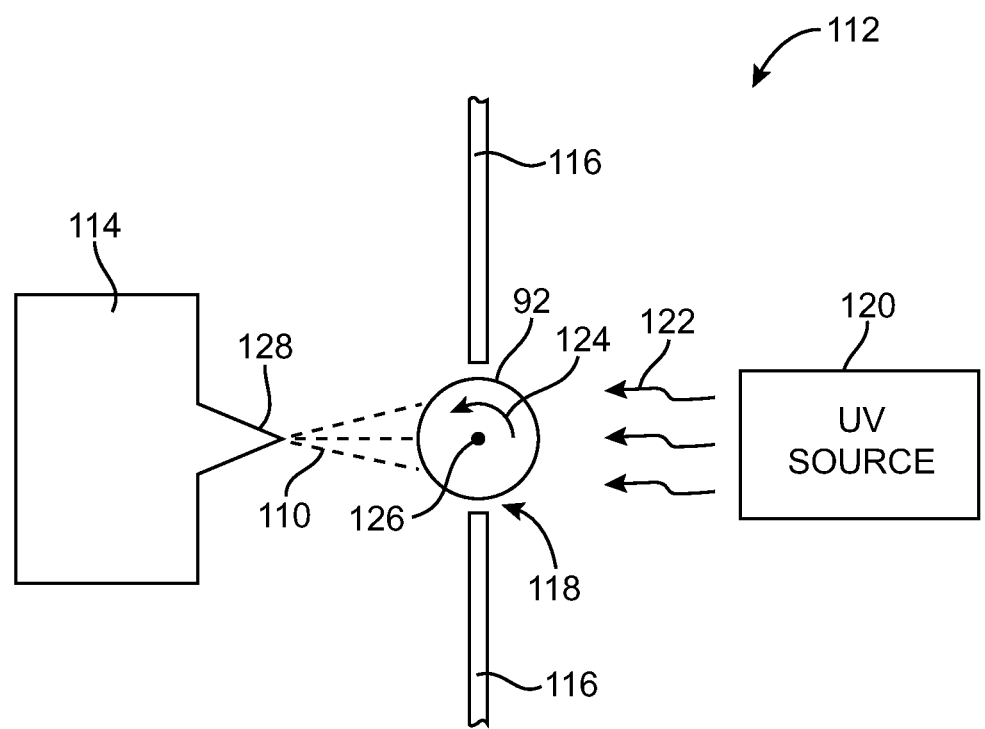
FIG. 19 is a top view of illustrative manufacturing equipment that may be used to incorporate binder into a tubular structure in accordance with an embodiment of the present invention.

As shown in FIG. 19, cable 92 may be rotated in direction 124 about longitudinal axis 126 while binder 110 is being sprayed onto cable 92 from spraying tool 114. Binder 110 may be cured using ultraviolet light 122 from ultraviolet light source 120. Shield 116 may prevent binder 110 from striking source 120 and may prevent light 122 from curing binder 110 at the exit of nozzle 128.

Figure 20:
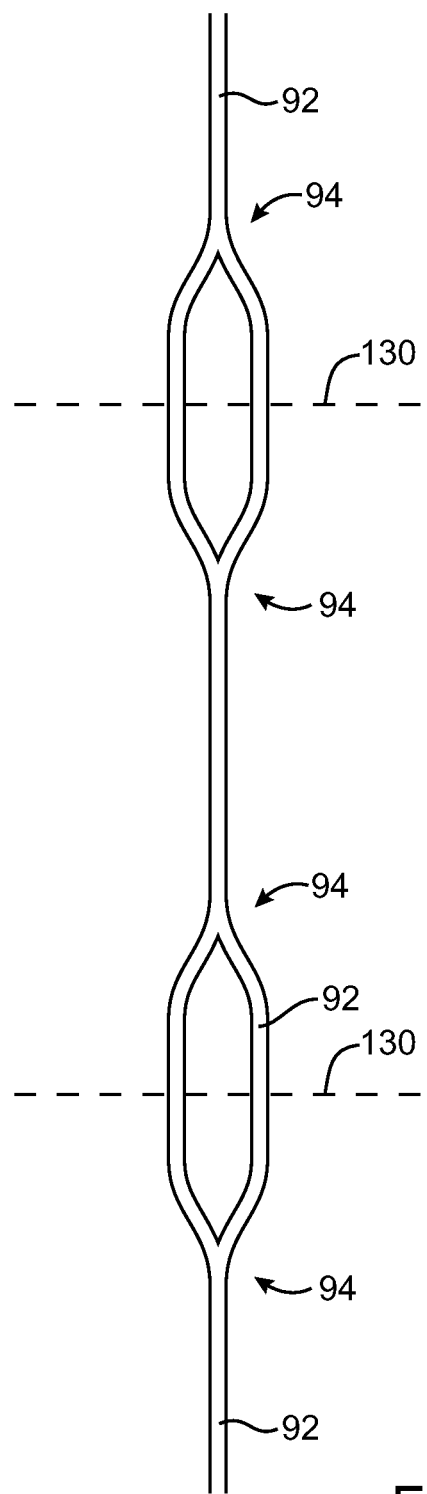
FIG. 20 is a view showing how a headset cables may be formed by cutting lengths of tube from a continuous tube of intertwined fiber having bifurcated sections in accordance with an embodiment of the present invention.

Equipment 10 may produce cable 92 using a continuous process. As shown in FIG. 20, equipment 10 may produce a cable shape that periodically forks to form two separate branches and then fuses so that the two branches form a single tubular structure. With this type of arrangement, post processing tools 18 of FIG. 1 may be used to cut cable 92 along cut lines 130.

Figure 21:
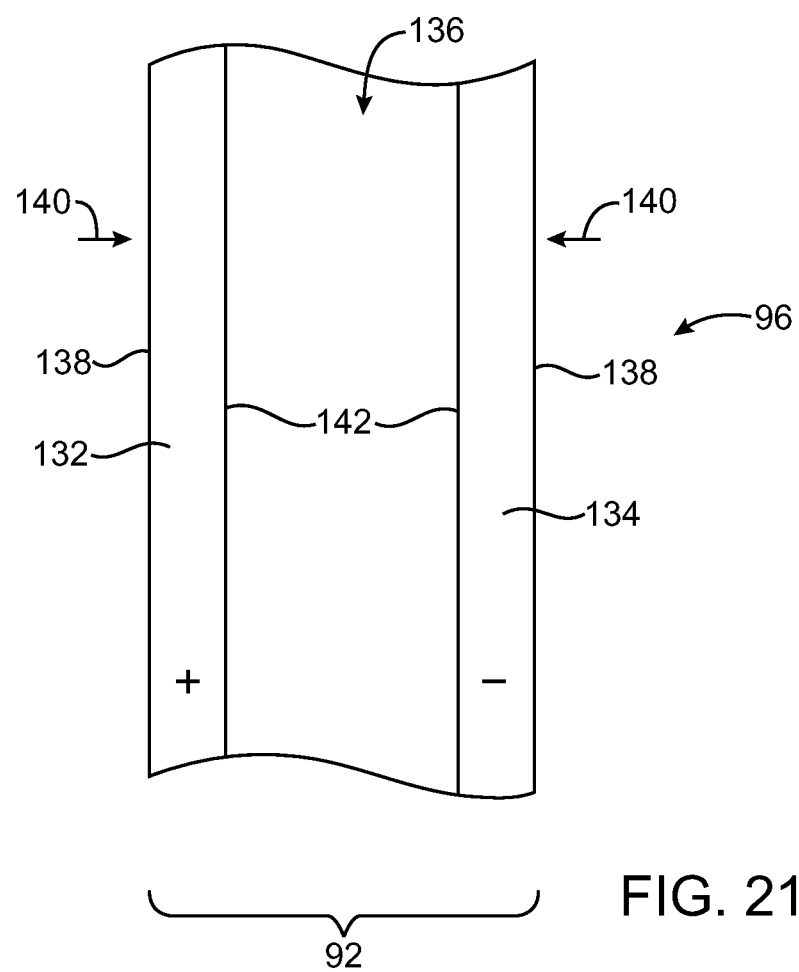
FIG. 21 is a cross-sectional view of an illustrative switch formed from intertwined conductive fibers in accordance with an embodiment of the present invention.

As shown in FIG. 21, cable 92 may be provided with conductive fibers such as fibers 132 and 134. This type of configuration may be produced when it is desired to form a switch in structure 94. As shown in FIG. 21, conductive fibers 132 and conductive fibers 134 in structure 96 may be separated by gap region 136. Region 136 may be filled with air (as an example). When a user squeezes outer edges inwardly in directions 140, opposing inner portions 142 of conductors 132 and 134 can meet, thereby closing the switch.

Figure 22:
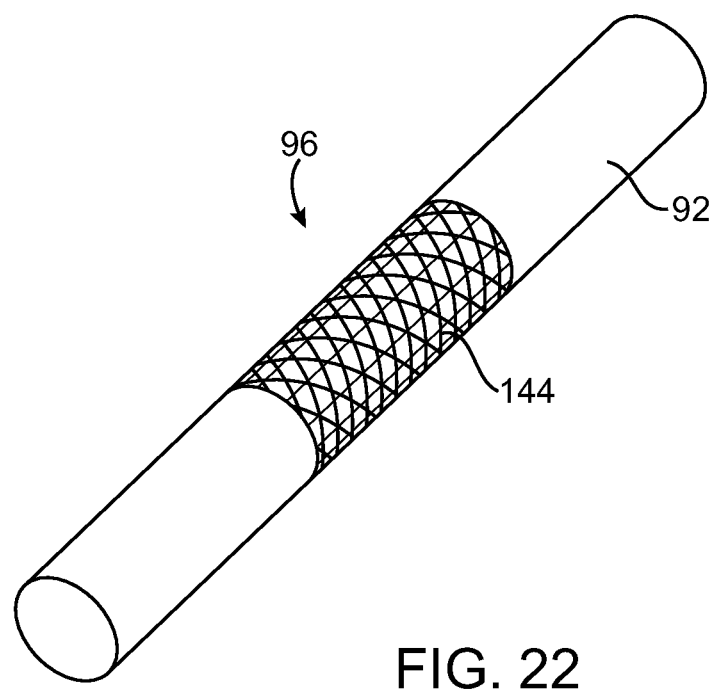
FIG. 22 is a perspective view of a tube of intertwined fibers having a conductive electrode portion for use in a switch or other structure in accordance with the present invention.

Conductive fibers on sheath 92 may be used to form a capacitor electrode (e.g., as part of a switch based on a capacitive sensor). This type of configuration is illustrated by conductive fiber band 144 on cable 92 in FIG. 22.

Figure 23:
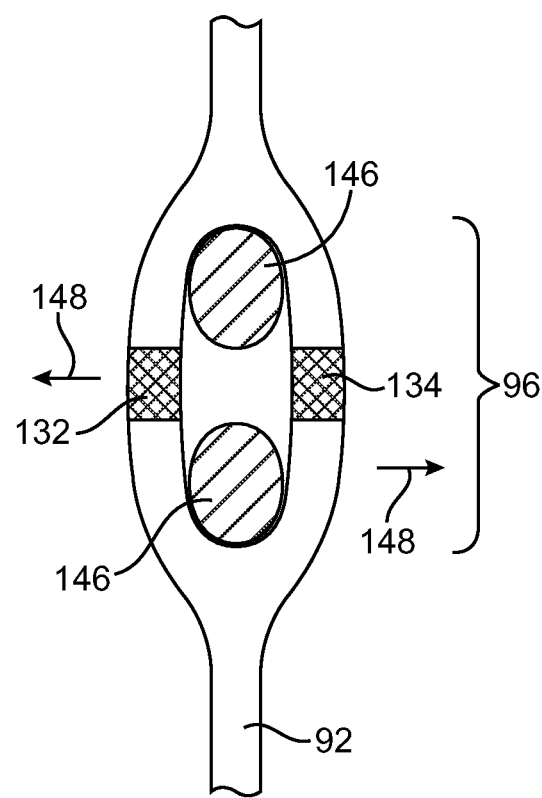
FIG. 23 is a cross-sectional view of an illustrative switch formed from a fiber tube with multiple branches with conductive fibers and insulating branch separator members in accordance with the present invention.

In the example of FIG. 23, switch 96 has been formed from opposing metal conductor portions 132 and 134 (each of which may be connected to a respective cable wire such as wires formed from wire bundles 102 and 104). Cable 92 may have two branches that rejoin each other on either end of switch structure 96. In the center of structure 96, outward biasing members 146 (e.g., air filled balloons or spring-filled members) may be used to bias switch contacts 132 and 134 away from each other in outward directions 148 so that switch 96 is off when not compressed inwardly by a user.

Figure 24:
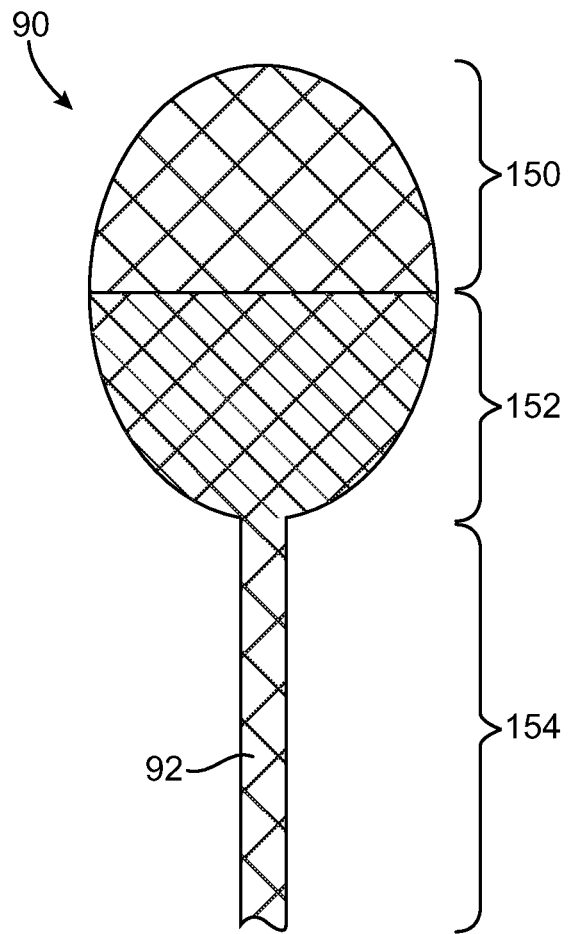
FIG. 24 is a side view of an illustrative fiber earbud structure having portions that are more dense and that pass relatively small amounts of sound and having portions that are less dense and that pass relatively large amounts of sound in accordance with an embodiment of the present invention.

A side view of an illustrative fiber-based earbud and associated cable is shown in FIG. 24. As shown in FIG. 24, earbud 90 may have regions 150 and 152. Region 150 may be more porous than region 152 and may be more (or less) flexible than region 152. The increased porosity of region 150 may make region 150 transparent to audio, so that sound from internal speaker drivers may pass through regions 150 unimpeded. Regions 150 may have fewer and less densely intertwined fibers than region 152 and may incorporate less binder than region 152 or no binder. It may be desirable to make region 152 less porous (e.g., to block sound, to increase rigidity or durability, etc.). Accordingly, more binder may be incorporated into region 152 than in region 150 and/or fibers may be more densely intertwined. In addition to increasing the fiber density and/or binder quantity in region 152, different (e.g., denser, thicker, etc.) fibers may be used in region 152. Cable 92 in region 154 may be formed of flexible fibers (e.g., with little or no binder). If desired, some of cable 92 near region 152 may be provided with stronger fibers, more fibers, more binder for rigidity and strength, etc.

Figure 25:
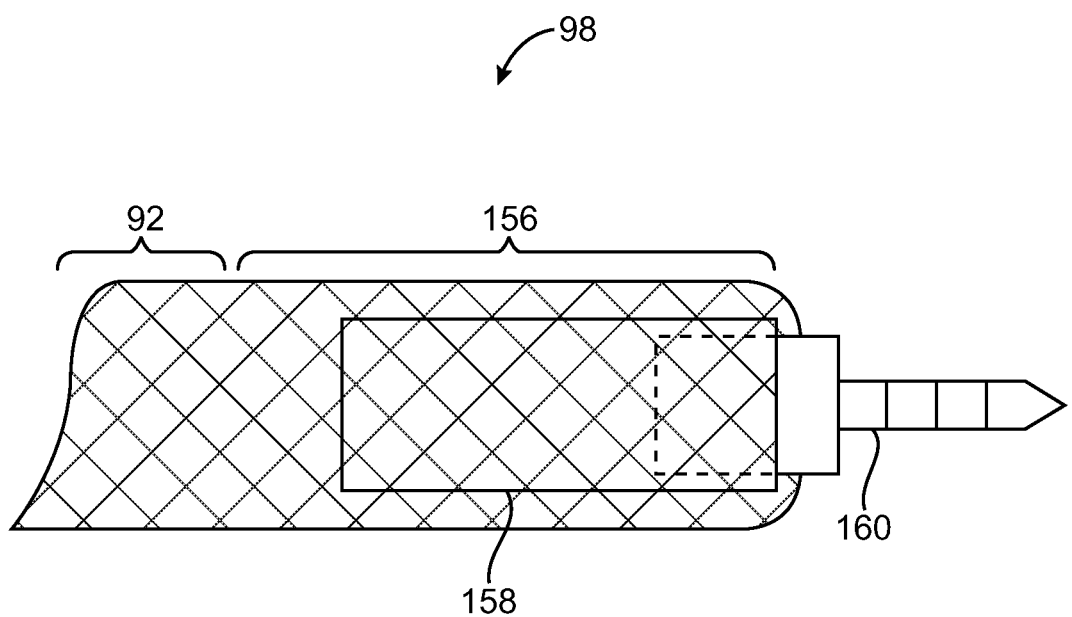
FIG. 25 is a side view of an illustrative audio connector such as a 3.5 mm audio plug showing how different parts of an associated sheath tube may be provided with different amounts of rigidity in accordance with an embodiment of the present invention.

As shown in FIG. 25, audio plug 98 (or other electrical connectors) may be provided with a flexible cable portion 92 and a rigid inner strain relief structure 158. Metal plug structure 160 may be connected to wires within cable 92. In region 156, binder may be incorporated into the fibers of cable 92 to increase strength and rigidity. If desired, cable 92 may also be provided with an increased number of strong fibers in region 156 and/or may be provided with a higher fiber density to further increase strength. These types of structural features may be used for any suitable electrical connector. The use of an audio connector in FIG. 25 is merely an example.

Figure 26:
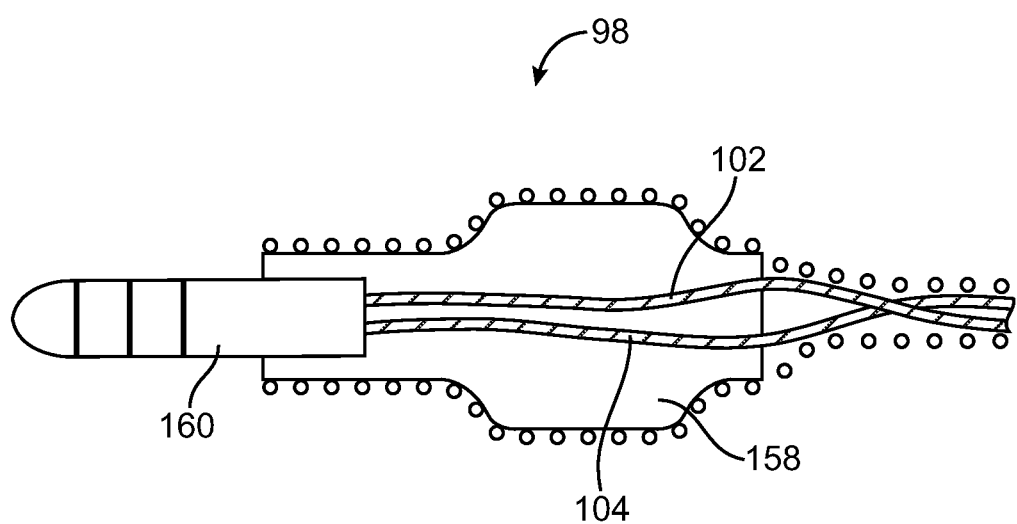
FIG. 26 is a cross-sectional side view of an illustrative audio plug and associated cable sheath that may be formed of intertwined fibers in accordance with an embodiment of the present invention.

FIG. 26 shows how cable 92 may form a conformal sheath over support (strain-relief) structure 158 and wires 102 and 104.

Figure 27:
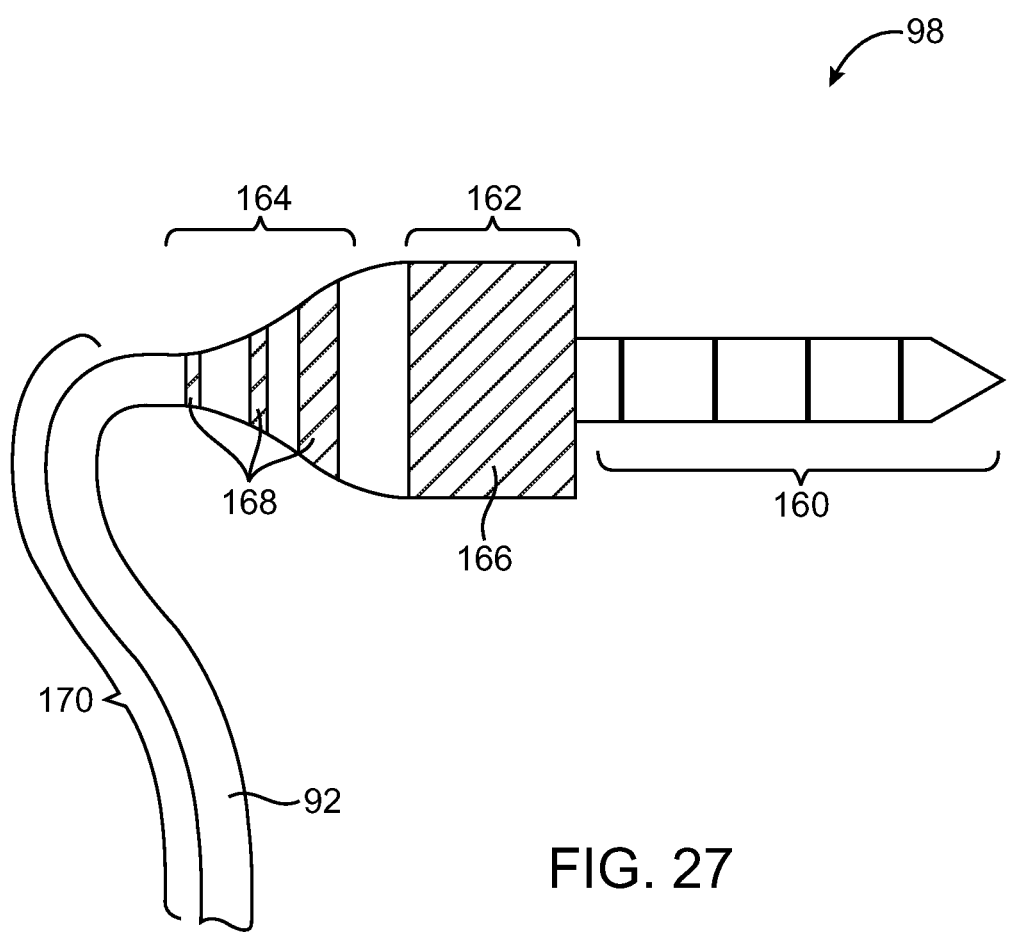
FIG. 27 is a side view of an illustrative audio plug having a fiber cable into which binder has been selectively incorporated to adjust cable flexibility along the length of the cable in accordance with an embodiment of the present invention.

The flexibility of cable 92 can be adjusted along its length by selectively incorporating binder in appropriate areas. This type of arrangement is shown in FIG. 27. In the example of FIG. 27, connector 98 may have a metal multi-contact portion such as portion 160 (e.g., a three-contact or four-contact audio plug). Region 162 of connector 98 may be completely filled with binder. Only some portions (e.g., rings 168) of region 164 are provided 15 with binder (in this example), so cable 92 will be more flexible in region 164 than in region 162. In region 170, there is no binder in the fibers of cable 92, so cable 92 has maximum flexibility in region 170.

Figure 28:
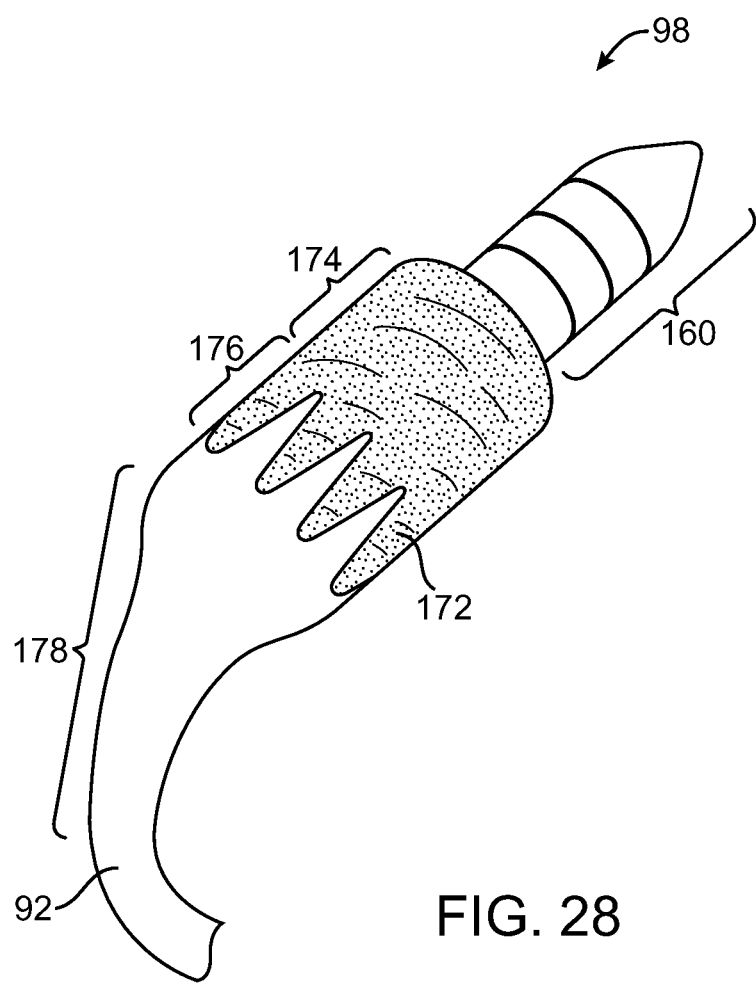
FIG. 28 is a perspective view of an audio plug and fiber cable showing how binder may be incorporated into the cable in a pattern that is not radially symmetric to gradually adjust cable flexibility in accordance with an embodiment of the present invention.

Another suitable arrangement for connector 98 is shown in FIG. 28. In the example of FIG. 28, cable 92 has no binder in region 178 and is therefore flexible in this region. In region 176, a non-radially symmetric pattern of binder 172 is used to provide a decreased flexibility. Region 174 has more binder than region 172 and is therefore rigid and structurally strong. This type of configuration allows the binder pattern in region 176 to serve as a moderate-flex interface between rigid region 174 and flexible region 178.

Figure 29:
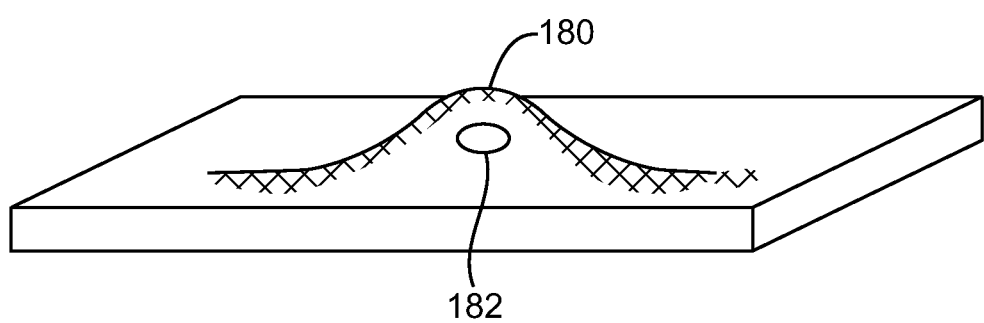
FIG. 29 is a perspective view of an illustrative complex structure of the type that may be formed in an electronic device structure using fiber intertwining and binder incorporation equipment in accordance with an embodiment of the present invention.

FIG. 29 shows how equipment 10 may be used to form complex shapes for part 20 such as hook 180 with hole 182. The fiber in hook 180 may be formed of stronger material than the fiber elsewhere in the structure. Part 20 may be formed as an integral portion of an electronic device housing (as an example)

Figure 30:
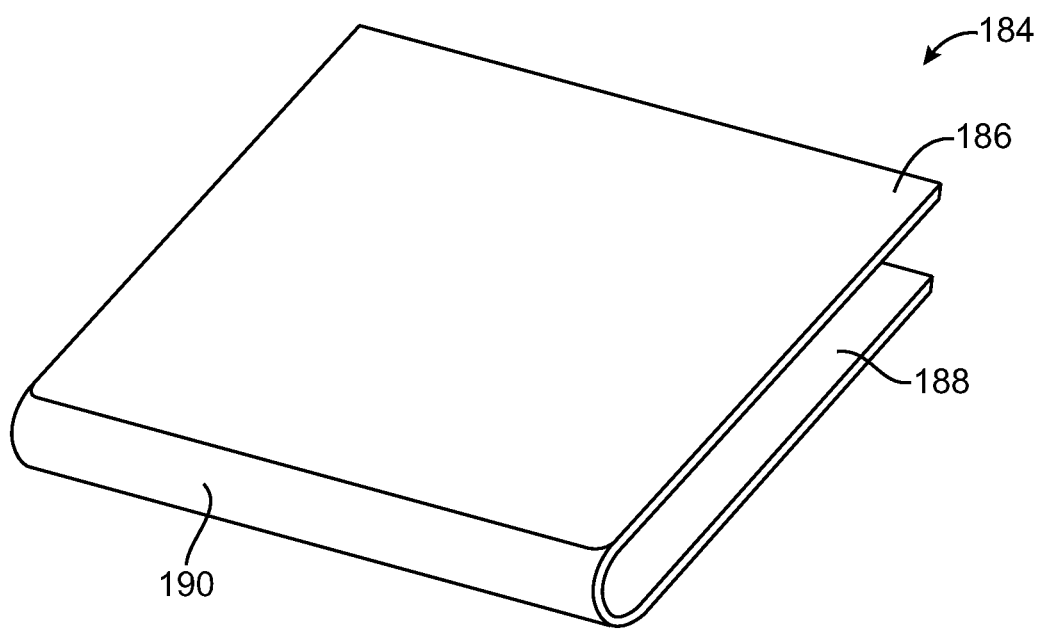
FIG. 30 is a perspective view of a fiber-based structure such as a computer housing or a protective detachable case for an electronic device that may be provided with a flexible hinge portion and rigid upper and lower planar portions in accordance with an embodiment of the present invention.

As shown in FIG. 30, equipment 10 may form structures such as structure 184 that have rigid planar portions such as rigid planar portions 186 and 188 and flexible hinge portions such as flexible hinge 190. This type of arrangement may be provided by incorporating binder into portions 186 and 188, but not into hinge 190. Structure 184 may be used for a portable computer housing, a folio-style case for a detachable electronic device such as a media player or cellular telephone, etc.

Figure 31:
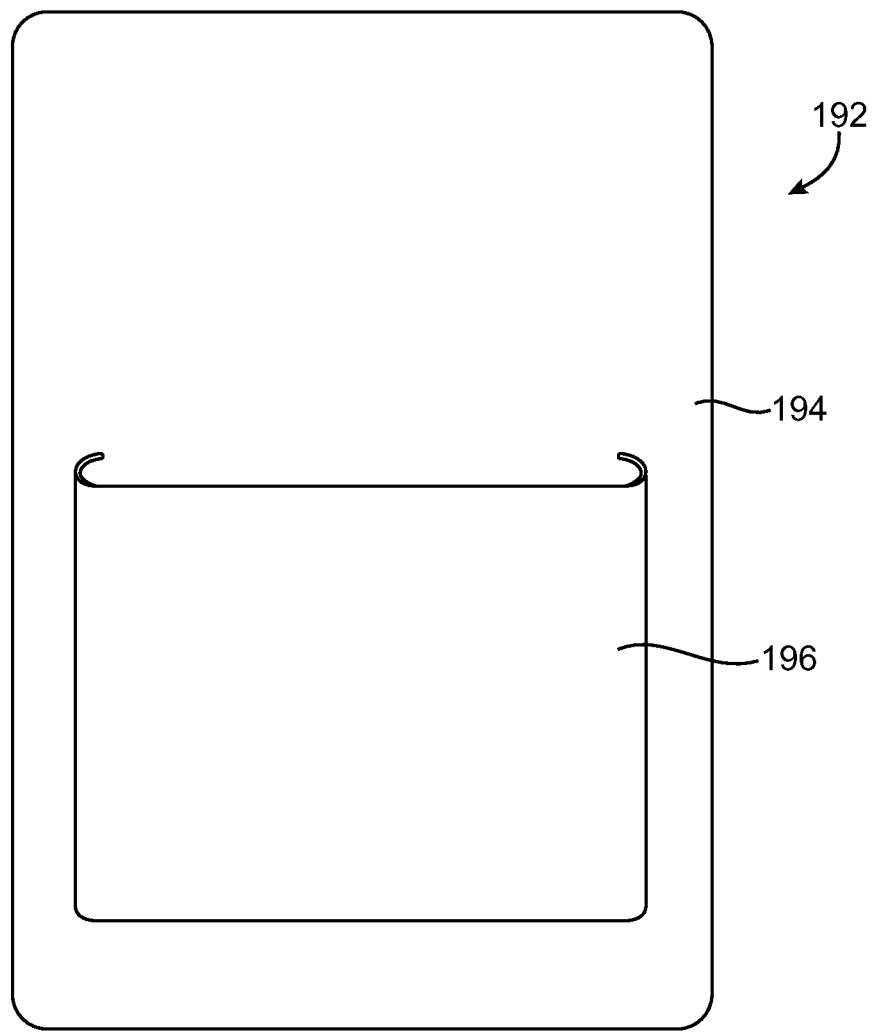
FIG. 31 shows how a fiber-based structure may be provided with a flexible pocket portion and a rigid planar portion in accordance with an embodiment of the present invention.

As shown in FIG. 31, a fiber-based case or other fiber-based structure 192 may be formed from a rigid binder-filled planer portion 194 and a flexible binder-free portion 196. Portion 196 may serve as a flexible pocket that holds a cellular telephone or music player. Portion 194 may be provided with a matching front face if desired.

Some parts that are formed from fiber-based structures may be used for electronic device housings or other applications in which at least a portion of the structure is adjacent to an antenna. In situations such as these, it may be desirable to incorporate one or more antenna windows into the part. For example, in an electronic device housing that is formed from conductive fibers, an antenna window that is transparent to radio-frequency antenna signals can be formed over an antenna within the electronic device housing. The antenna window 30 can be formed by incorporating a solid dielectric window in the housing and by attaching the conductive fibers to the solid window (e.g., using epoxy or other adhesive). Antenna window structures can also be formed by using equipment 10 to form an integral fiber-based antenna window structure within part of the electronic device housing. The antenna window structure may be formed from a fiber that contains primarily polymer, glass, or other dielectric. Because this material is nonconducting, the antenna window structure will be able to pass radio-frequency signals without interference from the fibers in the window.

Figure 32:
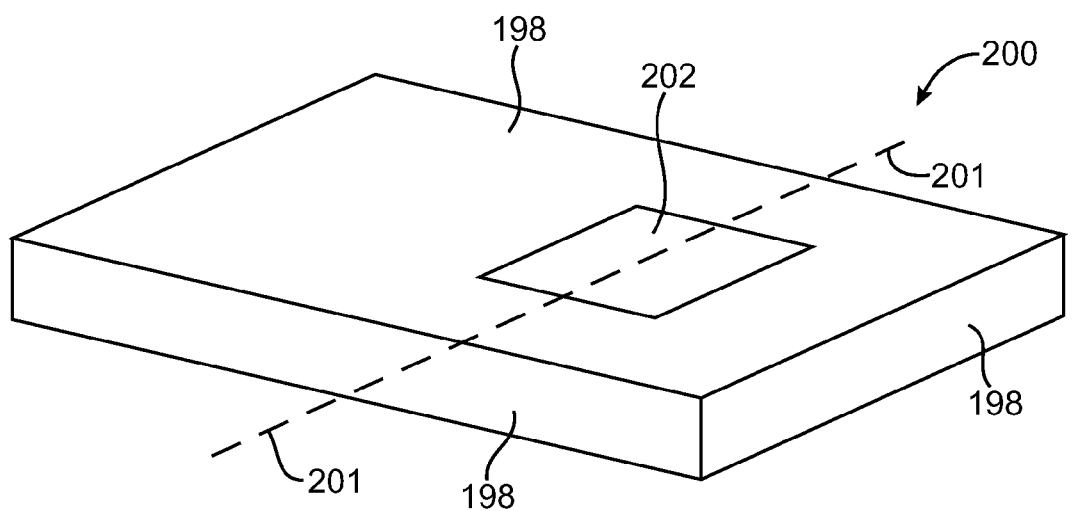
FIG. 32 is a perspective view of an illustrative electronic device having a housing formed of fibers with different properties in different regions to form a radio-frequency (RF) antenna window in accordance with an embodiment of the present invention.

An illustrative fiber-based structure with an antenna window is shown in FIG. 32. Structure 200 of FIG. 32 may be, for example, a housing for an electronic device such as a media player, cellular telephone, portable computer, or other electronic device. Structure 200 may be formed using equipment 10. For example, structure 200 may include corner portions that have compound shapes that have been created using intertwining tool 14 (e.g., 3D knitting equipment). In regions 198, housing walls can be formed from insulating or conductive materials or combinations of insulating and conductive materials (e.g., carbon fibers, polymers, steel filaments, etc.). The materials in regions 198 may include conductors (non-dielectrics) and may therefore block radio-frequency wireless signals. Equipment 10 can use dielectric fiber when forming the intertwined fibers of antenna window 202, thereby ensuring that the material in window 202 will be transparent to antenna signals.

Figure 33:
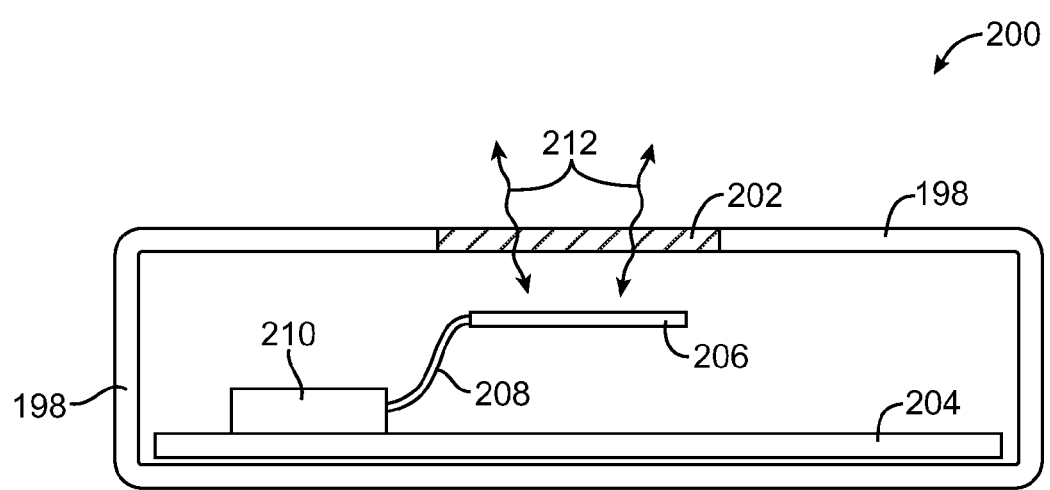
FIG. 33 is a cross-sectional side view of an illustrative electronic device of the type shown in FIG. 32 showing how an antenna and transceiver circuitry may be mounted within the device in accordance with an embodiment of the present invention.

A cross-sectional side view of structure 200 of FIG. 32 taken along line 201 is shown in FIG. 33. As shown in FIG. 33, structure 200 may have housing walls 198 that are formed from intertwined fibers and associated binder. In region 202, an antenna window is formed by using dielectric fibers and binder that are transparent to wireless radio-frequency signals. This allows radio-frequency signals 212 to pass through window 202 during wireless transmission and reception operations with antenna 206. Antenna 206, which may be a single band antenna or a multi-band antenna and which may include one or more individual antenna structures, may be coupled to radio-frequency transceiver circuitry 210 on printed circuit board 204 using transmission line path 208.

Figure 34:
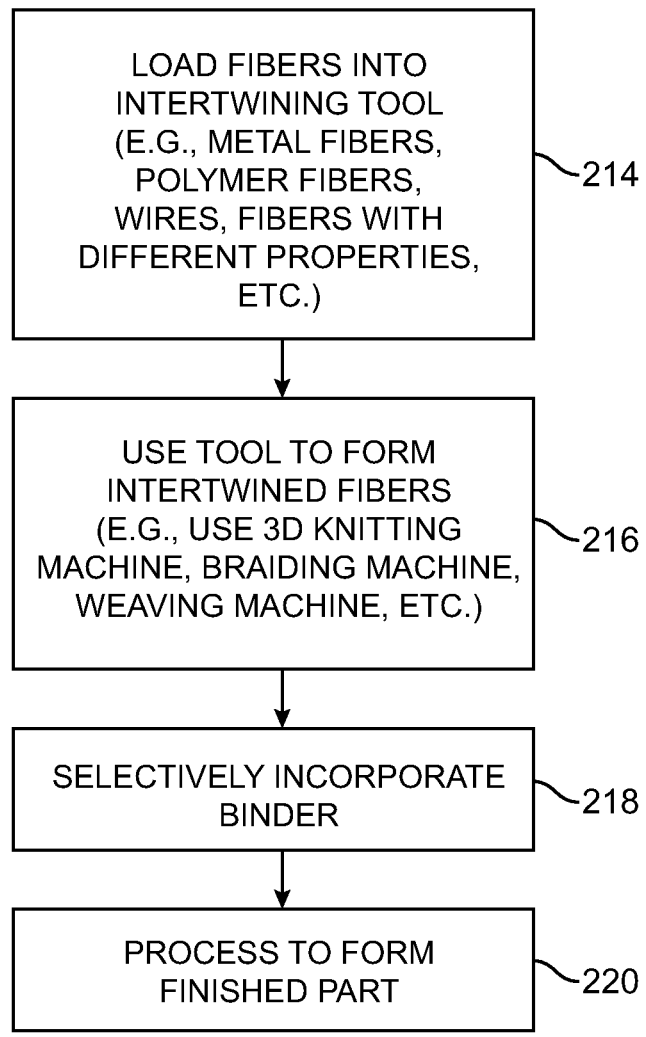
FIG. 34 is a flow chart of illustrative steps involved in forming fiber-based structures with selectively incorporated binder in accordance with embodiments of the present invention.

Illustrative steps involved in forming fiber-based structures using equipment 10 of FIG. 1 are shown in FIG. 34. At step 214, equipment 10 may be provided with one or more different sources of fibers (e.g., fiber sources 12 of FIG. 1). Fibers may be used that provide suitable amounts of strength, stretchability, flexibility, abrasion resistance, insulation, conductivity, color, weight, magnetism, etc. Some of the fibers may be formed from metals such as ferrous metals. Other fibers may be formed from polymers or glasses. There may be one, two, three, or more than three different types of fiber sources available to a given intertwining tool 14. Each fiber may have a different property and may be incorporated into a workpiece in an accurately controlled percentage. This allows tools 14 to form structures that have portions with different properties.

At step 216, tools 14 may be used to form fiber-based structures of appropriate shapes and sizes. Different types of tools may be used for different types of operations. For example, a computer-controlled braiding machine may be used to form a continuous or semi-continuous fiber-based tube for a headset cable sheath, a weaving tool may be used to form housing sidewalls for a portable computer with an integral antenna window or a flexible hinge portion, and a 3D knitting tool may be used to form housing shapes with compound curves for a cosmetic or structural housing surface. These tools may each be used to form separate parts that are assembled together by hand or by automated assembly tools or may be used to form unitary structures that are complete without the addition of further fiber-based parts.

During the operations of step 218, matrix incorporation equipment 16 may be used to selectively incorporate binder into the intertwined fibers that were produced during the operations of step 214. Binder may be incorporated in patterns that provide controlled amounts of flexibility. For example, binder patterns may include rings of the same shape or different shapes (e.g., rings of varying width of other patterns that provide a smooth transition in the amount flexibility at various points along the length of a tube or other elongated structure). Binder patterns may also include solid regions (e.g., for forming rigid planar structures such as housing walls for a portable computer, handheld electronic device, or other structure). Other regions of a structure may be provided with little or no binder (e.g., in a hinge structure, cable, or pocket where maximum flexibility is desired or in an earbud speaker port or computer housing speaker port where audio transparency is desired).

After incorporating desired patterns of binder into the intertwined fiber structures, additional processing steps may be performed during the operations of step 220. These operations may include, for example, assembling a headset by cutting headset parts from a continuous stream of parts, adding a cosmetic cover to a structural housing member, using adhesive or other fasteners to connect separate fiber-based structures to each other or to parts that do not include fibers, etc.

If desired, the steps of FIG. 34 may be repeated and/or performed in different orders. For example, it may be desirable to assemble two or more intertwined fiber parts before matrix incorporation operations are performed at step 218. It may also be desirable to build up complex structures by using a series of incremental operations. During each such incremental step, a layer of fiber-based material may be added to a workpiece and additional binder may be incorporated and cured. An incremental approach such as this may be used for part of a fiber-based structure while other parts of the structure are formed using a single intertwining operation and a single binder incorporation operation (as examples)

The foregoing is merely illustrative of the principles of this invention and various modifications can be made by those skilled in the art without departing from the scope and spirit of the invention.

What is claimed is:

1. An electronic device housing comprising:
   intertwined fibers including a first type of fiber having a first property and a second type of fiber having a second property; and
   a binder that binds the intertwined fibers together into a seamless housing structure including at least a planar section and a non-planar section forming one or more compound curves; wherein
   one of the planar and non-planar sections includes the first and second types of fibers in spatial variation with a higher concentration of the second type of fiber than the first type of fiber; and
   another of the planar and non-planar sections contains said first and second types of fibers in spatial variation with a higher concentration of said first type of fiber than the second type of fiber.

2. The electronic device housing defined in claim 1, wherein the one or more compound curves forms a corner.

3. The electronic device housing defined in claim 1, further comprising:
   an inner support structure that is covered by the seamless non-planar housing structure.

4. The electronic device housing defined in claim 3 wherein the inner support structure comprises a planar sheet of fiber.

5. The electronic device housing defined in claim 1 wherein the intertwined fibers comprise interwoven fibers.

6. The electronic device housing defined in claim 1 further comprising a hinge formed from intertwined fibers and attached to the housing.

7. The electronic device housing defined in claim 1, wherein the second type of fibers comprise plastic fibers.

8. The electronic device housing defined in claim 1, wherein the first type of fibers comprise conductive fibers.

9. The electronic device housing defined in claim 1; wherein
the first type of fibers comprise conductive fibers and form a conductive portion of the housing that blocks radio-frequency signals; and
the second type of fibers comprise dielectric fibers that form a window portion of the housing that is transparent to radio-frequency signals.

10. The electronic device housing defined in claim 1, wherein the electronic device housing comprises a computer housing.

11. An electronic device comprising:
a housing formed from:
intertwined fibers, comprising:
a first type of fiber transparent to radio-frequency signals;
a second type of fiber that blocks radio-frequency signals; and
a binder that binds together the intertwined fibers;
an antenna within the housing; wherein
the housing defines a first region, a second region adjacent the first region, and a third region adjacent the second region;
the first region is formed primarily from the first type of fiber and is transparent to radio-frequency signals;
the second region is formed from a spatially varying concentration of the first and second fibers;
the third region is formed primarily from the second type of fiber and blocks radio-frequency signals; and
the antenna is disposed to emit signals through the first region.

12. The electronic device of claim 11, wherein the first, second and third regions are integrally and unitarily formed with one another.

13. The electronic device defined in claim 12, wherein the second portion of the housing is seamless and non-planar.

14. The electronic device defined in claim 13, wherein the second portion of the housing forms at least one curved corner.

15. The electronic device defined in claim 12, wherein the fibers comprise interwoven fibers.

16. The electronic device defined in claim 12, wherein the second type of fibers comprise nylon fibers.

17. The electronic device of claim 12, wherein the first, second and third regions are formed as a continuous surface as a single element.

18. The electronic device of claim 12, wherein the first, second and third regions are woven together.

* * * * *